US007421472B1

(12) United States Patent
Ross, Jr.

(10) Patent No.: US 7,421,472 B1
(45) Date of Patent: Sep. 2, 2008

(54) SYSTEM, METHOD, AND COMPUTER PROGRAM PRODUCT FOR PROVIDING A MULTI-USER E-MAIL SYSTEM

(76) Inventor: Robert C. Ross, Jr., 2800 Dauphin St., Suite 100, Mobile, AL (US) 36606

( * ) Notice: Subject to any disclaimer, the term of this patent is extended or adjusted under 35 U.S.C. 154(b) by 338 days.

(21) Appl. No.: 09/714,997

(22) Filed: Nov. 20, 2000

Related U.S. Application Data

(60) Provisional application No. 60/166,409, filed on Nov. 19, 1999.

(51) Int. Cl.
*G06F 15/16* (2006.01)
(52) U.S. Cl. ........................... 709/206; 715/750
(58) Field of Classification Search .............. 709/206, 709/250; 345/750, 751, 752, 733, 764, 741, 345/810, 835
See application file for complete search history.

(56) References Cited

U.S. PATENT DOCUMENTS

| | | | |
|---|---|---|---|
| 4,868,877 A | | 9/1989 | Fischer |
| 5,093,918 A | * | 3/1992 | Heyen et al. ............... 709/215 |
| 5,150,411 A | | 9/1992 | Maurer |
| 5,283,856 A | | 2/1994 | Gross et al. |
| 5,528,745 A | | 6/1996 | King et al. |
| 5,689,642 A | | 11/1997 | Harkins et al. |
| 5,796,394 A | | 8/1998 | Wicks et al. |
| 5,799,086 A | | 8/1998 | Sudia |

(Continued)

FOREIGN PATENT DOCUMENTS

JP 9-134319 5/1997

(Continued)

OTHER PUBLICATIONS

Boyce, Jim, et al. "Special Edition Using Microsoft Office 97 Professional, Best Sellers Edition", published by Que Corporation, Indianapolis, Ind., 1997, pp. 727-728, 731-734, 780, 804-805, and 808.*

(Continued)

*Primary Examiner*—George C Neurauter, Jr.
(74) *Attorney, Agent, or Firm*—Venable LLP; Ralph P. Albrecht; Kyle D. Petaja (57) ABSTRACT

A system, method, and computer program product for providing a multi-user shared e-mail system on a single computer is described. The system enables multiple users to use a single computer to provide for each user, one at a time, access to a personal secure e-mail account environment for that user. The e-mail account environment can include an inbox, an outbox and one or more folders to store received e-mail. The multiple e-mail account environments are all stored on the single computer. The single computer can be standalone, or can include an interface to a network, such as the Internet, for delivery of e-mail to users whose e-mail accounts do not reside on the single computer. The multi-user e-mail account system on a shared single computer provides cost efficient access for a large number of users which do not each need their own computer. The e-mail system includes a prioritization indicator to determine which of the multiple users of the shared e-mail system can get access first. Priority can reflect, e.g., receipt of new e-mail by an account and the urgency of received e-mail.

15 Claims, 9 Drawing Sheets

U.S. PATENT DOCUMENTS

| | | | |
|---|---|---|---|
| 5,867,822 | A | 2/1999 | Sankar |
| 5,956,486 | A * | 9/1999 | Hickman et al. ............ 709/206 |
| 5,960,406 | A | 9/1999 | Rasansky et al. |
| 6,108,420 | A | 8/2000 | Larose et al. |
| 6,189,032 | B1 * | 2/2001 | Susaki et al. ................ 709/225 |
| 6,247,045 | B1 * | 6/2001 | Shaw et al. ................. 709/207 |
| 6,313,880 | B1 * | 11/2001 | Smyers et al. .............. 348/552 |
| 6,362,838 | B1 | 3/2002 | Szlam et al. |
| 6,510,452 | B1 * | 1/2003 | Brisebois et al. ............ 709/204 |

FOREIGN PATENT DOCUMENTS

| | | |
|---|---|---|
| JP | 11-272594 | 10/1999 |
| JP | 2000-137656 | 5/2000 |
| JP | 2000-285040 | 10/2000 |

OTHER PUBLICATIONS

Temple, Bob. "The Complete Idiot's Guide to Microsoft Outlook 2000", published by Alpha Books, Indianapolis, Ind., Apr. 1999 pp. 49-50 and 115-117.*

Moore, K. "Request for Comments (RFC) 1891: SMTP Service Extension for Delivery Status Notifications", published by Network Working Group, Jan. 1996, 31 pages.*

Fajman, R. "Request for Comments (RFC) 2298: An Extensible Message Format for Message Disposition Notifications", published by Network Working Group, Mar. 1998, 28 pages.*

Borland, Russell. "Running Microsoft Mail for Windows—Version 3.0", Microsoft Press, 1993, pp. 2, 6, 41-43, 81, and 110-113.*

Nelson, Stephen L. "Microsoft Outlook 98 At a Glance", Microsoft Press, 1997, pp. 13, 24, 48, 50, and 198.*

Padwick, Gordon. "Using Microsoft Outlook 98", published by Que on Apr. 20, 1998, pp. 197-208, 339-356, and 538-539.*

Cataplut, Inc. "Microsoft Outlook 2000 Step by Step", Microsoft Press, Jul. 1999, pp. 70-74 and 78-79.*

Sams Publishing. "Sams Teach Yourself Microsoft Outlook 2000 in 24 Hours", May 1999, pp. 180-182, 186-188, and 221-231.*

Catapult, Inc. "Microsoft Outlook 2000 Step by Step", Microsoft Press, Jul. 1999, pp. 75-77 and 80-81.*

International Search Report issued by the International Search Authority for international application No. PCT/US01/43060 with international filing date of Nov. 13, 2001.

* cited by examiner

READ RECEIPT REPORT

SOURCE CODE VIEW
EMBEDDED PUBLIC KEY

SYSTEM, METHOD, AND COMPUTER PROGRAM PRODUCT FOR PROVIDING A MULTI-USER E-MAIL SYSTEM

CROSS-REFERENCE TO RELATED APPLICATION

The present application claims priority to U.S. Provisional Patent Application No. 60/166,409, filed Nov. 19, 1999 of common title, inventor, and assignee to the present invention, the contents of which are incorporated herein by reference in their entirety.

BACKGROUND OF THE INVENTION

1. Field of the Invention

The present invention relates to electronic mail (e-mail) systems and more particularly, to multiple user e-mail systems.

2. Related Art

Electronic mail, also known as e-mail, is a widely used means of communicating between communication devices such as computers. A conventional e-mail system enables sending e-mail notes or e-mail messages much like a conventional postal letter from a source to a destination. For example, a sender could send an e-mail message including a return e-mail address to a receiver at the receiver's e-mail address on another computer through a network connecting the computers. E-mail messages provide several advantages over conventional postal mail, such as, for example, faster preparation time, faster delivery time, a simpler addressing scheme than using name, street address or post office box, city, state and zip code, and lower cost. E-mail systems can provide an efficient means of distributing information internal to and external from an enterprise or business. However, conventional e-mail systems have limitations when used in, e.g., a manufacturing plant or production environment such as, e.g., a hospital, or retail business. For example, conventional e-mail systems require that each user have a computer with which to access the e-mail system. In a production or manufacturing environment, a machine operator often will not have access to a computer. Also, it may be unsafe in certain environments to permit a worker to be distracted by e-mail while performing tasks such as, e.g., monitoring a mission critical operation, such as where a worker is operating heavy machinery or a nurse in a hospital. Limitations of conventional e-mail systems can prevent many users within organizations from, e.g., accessing important corporate information that is most efficiently distributed over e-mail.

Historically, e-mail messages have included primarily text. Eventually, users were able to attach files for delivery along with an e-mail textual message. Such attached files are often called "attachments." Many e-mail systems support attaching multiple documents to an e-mail message. Unfortunately, when an e-mail user desires to forward an attachment, the attachment is conventionally forwarded along with the message containing it causing the forwarded e-mail with attachment to be encapsulated within the new e-mail.

One type of e-mail system is a client/server e-mail system. The e-mail system can use a centralized post office box that resides on a server somewhere on the network to which client e-mail user computers are attached. The post office box can be used, e.g., to store a message from a sender which can then forward the message later to a temporarily disconnected addressed receiver. The centralized post office can also permit messages to be centrally backed up on a periodic basis. With a client/server e-mail system, a portion of the e-mail generating program can reside on a client's computer (the computer of the sender or receiver), and another portion of the e-mail system can reside on a server computer. E-mail application software can run on a variety of operating systems and computer system platforms. Conventionally, e-mail messages are stored on the central server computer and are accessed via the client user computers.

Another type of client/server e-mail system is known as "groupware." Groupware enables functions in addition to the communication capability of e-mail including, for example, project management, location independent cooperation and information accessibility links.

Examples of e-mail systems include, for example, Lotus cc:Mail available from IBM, Outlook, Exchange, and MS Mail available from MICROSOFT of Redmond, Wash., USA, PROFS and OFFICEVISION available from IBM of Armonk, N.Y., USA, All-In-One from Compaq of Houston, Tex., USA, online service provider integrated e-mail systems such as, e.g., that provided by AMERICA ONLINE (AOL) of Vienna, Va., USA, the Internet Protocol's Simple Mail Transfer Protocol (SMTP), and various Internet based e-mail systems such as those available from JUNO and NETZERO. Examples of groupware include Lotus Notes available from IBM, Exchange available from MICROSOFT, Collabra Share available from NETSCAPE, and Groupwise available from NOVELL.

Early e-mail systems sent messages to users within an organization known as an intranet system, with little consideration taken to interacting with other e-mail systems or networks. An intranet is a term often used to describe a stand alone network or group of networks which includes a related group of senders and receivers, such as, for example, the employees of a commercial company.

Some intranet e-mail systems are equipped to inter-operate with other e-mail systems. Computers coupled by a network communicate by using communication software programs which in turn use a communication language or "protocol." Some e-mail systems are implemented using a so-called "open systems" communications method such as the transmission control protocol/internet protocol (TCP/IP) suite of protocols. The TCP/IP protocol suite includes the SMTP e-mail functionality already mentioned.

An internet (i.e. with a lower case "i") is a network which couples two separate networks to one another. The global Internet (i.e. with a capitalized "I") is an internet that grew out of a U.S. Defense Advanced Research Projects Agency (DARPA) project. The Internet originally served a largely technical audience composed of the military, government agencies, and academic researchers and scientists. The original goals of the project were to allow researchers to share computing resources and to exchange information, regardless of their locations, and to create a resilient, fault-tolerant wide area network (WAN) for military communications. The global Internet implements communication using the TCP/IP communications protocols.

On-line service providers originally provided e-mail system access to individuals via modem connections. On-line service providers include, for example, American On Line (AOL), CompuServe, and Prodigy. Online services traditionally created offerings targeted toward home computer users. These providers often provided proprietary e-mail systems to connect their users to one another. In time, users on proprietary on-line services, were able to send messages to users on other e-mail services via the Internet.

During the mid-1990's, commercial enterprises and individuals increasingly discovered the benefits of being connected to the Internet, eventually creating a mass-market phenomenon. Today, although access is limited in some areas, most countries have ties to the Internet. Thus, the Internet has enabled widespread, standardized intercommunication between users of disparate e-mail systems.

Small and medium sized businesses have many users which do not have access to a computer with which to send and receive e-mail. Workers in various professions including, e.g., healthcare workers in a hospital and retail, because of their jobs, may not have access to conventional email. It is desirable that all employees of a business have access to e-mail resources for such purposes as, e.g., for efficient distribution of information to employees from an employer. In many cases, it can be desirable that the employer not be required to purchase a computer for use by each of the employees. It is also desirable that the employer be able to filter out any junk e-mail, commonly known as "spam," being sent to the employees. It is also desirable that employees such as, e.g., in a retail business, production, or operations such as a hospital, not be permitted to access their e-mail at all times in order to maintain high worker productivity.

Thus, what is needed in an improved e-mail system which can provide access to various users in a production, or operational environment such as, e.g., healthcare, retail or other professionals in an environment without individual access to a personal computer, who presently are unable to access e-mail and other useful functions.

SUMMARY OF THE INVENTION

A method, system, and computer program product are provided that enable multiple users to access e-mail through a single shared computer including password authentication, secure definable file folder storage and a user access priority indicator. In one embodiment of the invention, the e-mail can include various new and useful features, such as, e.g., human resource communication and statistics tools, timeclock in/out, incoming mail filters, delayed receipt of e-mail, delayed message sending, auto-reply, auto-forwarding, encryption, automatic passing of a public key, advertising banners, embedded voicemail and video attachments, removal of embedded characters, direct attachment viewing, direct sending of attachments, spell-check, thesaurus, text view formatting (HTML or standard text), personal memo creation, address book, smartnames callup of addressee by typing letters of the name, user-selectable hotkey functions, remote logon to file folder from web interface, and an administration system for setup of passwords, secure folders, and filtering.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digits in the corresponding reference number.

BRIEF DESCRIPTION OF THE DRAWINGS

The foregoing and other features and advantages of the invention will be apparent from the following, more particular description of a preferred embodiment of the invention, as illustrated in the accompanying drawings.

DETAILED DESCRIPTION OF THE INVENTION

The preferred embodiment of the invention is discussed in detail below. While specific implementations are discussed, it should be understood that this is done for illustration purposes only. A person skilled in the relevant art will recognize that other components and configurations may be used without parting from the spirit and scope of the invention.

OVERVIEW OF THE INVENTION

In many production, retail, healthcare, hospital, manufacturing or other environments, workers do not have access to a computer and e-mail, and at scheduled times go to a break room for a break. The present invention is directed to a system, method and computer program product that enables multiple users to access a single shared computer to send, receive and store e-mail messages. The system can be used continually in real-time working environment.

In one embodiment of the invention, the multiple user, shared single computer e-mail system permits these multiple users to view the computer and through a user interface identify whether new e-mail has arrived for any of the users.

In one embodiment, the users can use a touchscreen to identify themselves to the system and the system can then require entry of a password to authenticate the user. Alternatively, a conventional display monitor can be used for output of status information and a mouse or other pointing device or keyboard or other device can be used for input.

In another embodiment, the system can through its user interface identify a priority level of newly received e-mail, to prioritize which of the multiple users should gain access to the shared computer first. In one embodiment, the priority level can be identified by, e.g., providing a colored representation as to the urgency of the e-mail, such as, e.g., a colored or blinking name or button, or alphanumeric or other indication of priority such as, e.g., a ranked list.

In an embodiment of the invention, the user with the highest priority could then access the shared e-mail system first. The user with the highest priority e-mail message can then select to open his or her e-mail.

In one embodiment of the invention, a user can select to open the user's name by, e.g., using a mouse, key or highlighting a name or button with a cursor. In an embodiment, the user can then be prompted to provide authentication information such as, e.g., a password and/or company badge, to gain access to that user's personal e-mail environment.

In one embodiment of the invention, a user's personal e-mail environment can include, e.g., an inbox, an outbox, and at least one user definable file folder into which received messages can be stored. In an embodiment of the invention, the system can store messages in file folders named by sender of the message or can permit the user to provide another name for the folder such as "personal." In one embodiment of the invention, the file folders can include different security features such as, e.g., passwords for access to the specific file folder.

An encryption feature can be used to encrypt and decrypt the contents of e-mail messages to prevent unauthorized access to the contents of a message. In one embodiment, a public key can be automatically sent with an email. The public key can be included at the top of an email in one embodiment. Advantageously, to exchange public keys, two users can send emails to one another.

In one embodiment of the invention, a first group including a first subset of all users can use a first single shared computer and a second group including a second subset of all users can use a second single shared computer.

In another embodiment of the invention, a banner can be included onscreen to display advertising or other relevant information to users of the shared e-mail system. Advantageously, the banner can be used, e.g., to display advertising information which can be used, e.g., to offer the e-mail system for free or a discount to businesses.

The shared e-mail system can include other useful features such as, e.g., a dictionary for spellcheck, a thesaurus, a grammar checker, multiple standard replies, or standard reply lists (such as, e.g., an informal reply, a business or formal reply), address book for selecting recipients, special text viewing (e.g., permitting viewing HTML or text), smart names (e.g., permitting entry of letters of a name causing, e.g., lookup of one or more addressbook entries having those letters, a list of names, or the addressbook interface itself by a function key combination), user selectable function keys (e.g., permitting a user to assign particular functions to key combinations such as, e.g., Alt-k to bring up the address book), a memo feature (i.e., enabling preparing brief memos to oneself).

In another embodiment of the invention, a user can access the user's e-mail environment from the Internet's world wide web ("web"). In one embodiment, storage of the user's e-mail environment is mirrored to a server on the world wide web and is kept in synchrony. In one embodiment, a user from the web interface can send, receive, store in folders, move and delete messages. In one embodiment of the invention, the e-mail system can use a version of the standard POP3 mail application modified for the specific features of the shared e-mail system.

The present invention can also include human resource features. For example, in one embodiment of the invention, a user can clock in and clock out via the system to provide an automated timeclock.

Another human resource feature can permit tracking user statistics by capturing user data via the system including, e.g., the number of employees, the number of hourly employees, the number of female and males workers, hours worked, whether someone is in or out.

Another human resource feature of the present invention includes provision of a company wide e-mail for use in, e.g., notifying all employees of events, company policy and other announcements. The present invention, in one embodiment, can require each employee to acknowledge that they have read an e-mail (e.g., regarding a company policy) and the system can automatically compile a single record regarding all employees indicating which employees opened the e-mail and which did not. A report referred to as a read receipt report can be generated that can track which recipients have accessed a sent file. In one embodiment, the date and time of access can be tracked also. In one embodiment the report can be continually updated.

The present invention provides several other features applicable to general e-mail systems. For example, the present invention can include an e-mail system having a function that automatically removes greater-than (">") signs that other e-mail systems could have embedded into forwarded e-mails.

Another e-mail feature includes in the window interface that presents the contents of an open e-mail, a graphical display indicating a hierarchy of forwarded e-mails and attachments. Advantageously, the graphical display enables forwarding of only an included forwarded e-mail or attachment.

Another embodiment of the present invention can filter e-mail obtained from a list of internet locations (e.g., addresses or domain names), which can be maintained by an administrator (i.e., in one embodiment of the invention for a single user version, the administrator can be the user).

In one embodiment of the invention, the filter can refuse acceptance of e-mails from those designated locations by maintaining a so-called "no spam" list. The filter can be used to block other e-mail based on criteria set by the administrator, such as, e.g., limiting the size of an e-mail or attachments.

In one embodiment of the invention, incoming e-mail can be queued and can be forwarded to the recipient e-mail user, only at a particular time (such as, e.g., break time, lunch time, or after hours). Advantageously, this feature can prevent employees from sneaking off at non-break times to check e-mail. In another embodiment of the invention, access to a user's e-mail box can be restricted to only particular times of the day, avoiding employee temptation to check e-mail.

In another embodiment of the invention, sending of a message can be delayed to a given time by inputting a send date and time upon creation of the e-mail. Advantageously, the delayed send e-mail feature can enable earlier entry of e-mail birthday greetings to be sent on an employee's birthday.

In another embodiment of the invention, a feature can be provided to store e-mail in a folder which can default to be titled by the sender's e-mail userid (i.e., also commonly referred to as usernname, screenname, or e-mail address). The user can be permitted to modify the folder name such as, e.g., to replace it with the sender's company name, or department name, or other designation for the folder such as, e.g., "personal," or "confidential." In another embodiment of the invention, the system can automatically timeout and close a user's e-mail if no action has been made for a selectable period of time, to prevent unauthorized access to the user's e-mail environment.

AN EXEMPLARY EMBODIMENT OF THE INVENTION

Figure 1A:
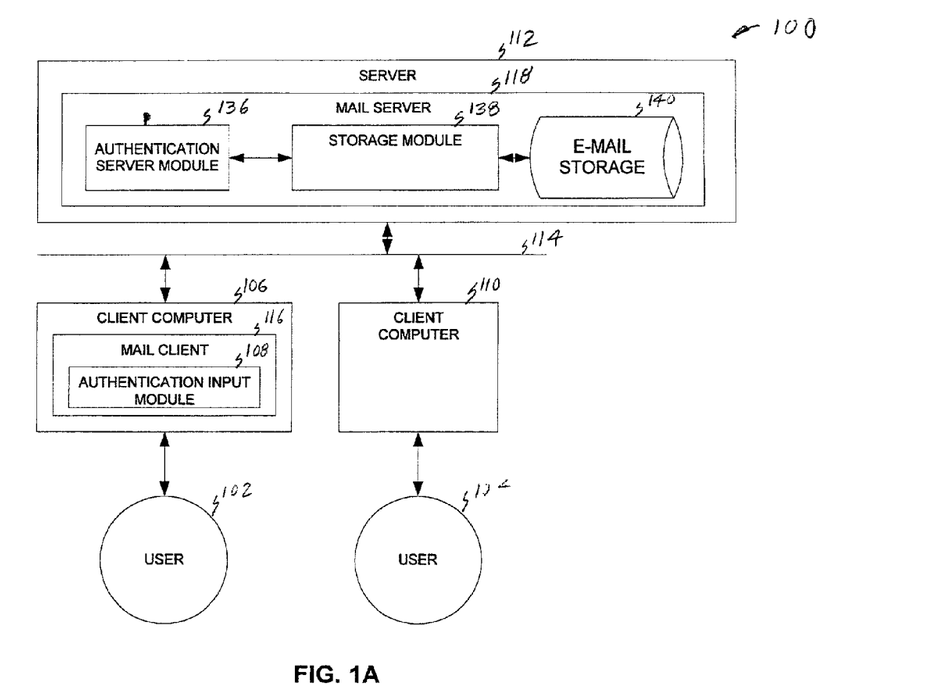
FIG. 1A is a block diagram of a distributed client/server e-mail system.

FIG. 1A illustrates a block diagram of e-mail system environment 100. Email system environment 100 can include an exemplary distributed client/server computer e-mail system. E-mail system environment 100 can include a sending user 102 which sends an e-mail message to a receiving user 104. Sending user 102 creates the e-mail on a client computer 106. Client computer 106 transmits the e-mail from sending user 102 to receiving user 104 on a client computer 110. An e-mail message may be created via mail client 116 of client computer 106 and may be sent via interaction with a mail server 118 on a server 112 over a communications network 114. An e-mail 200, described further below with reference to FIG. 2, in being sent from its source, i.e., sending user 102, can travel over communications network 114, and can pass through other computers (i.e., not shown) enroute to its final destination, client computer 110 for receipt by receiving user 104. In one embodiment of the invention, communications network 114 includes an intranet. In another embodiment, communications network 114 includes the global Internet. It would be apparent to a person having ordinary skill in the art that the features of the present invention can be used in alternative e-mail system environments and architectures.

Figure 1B:
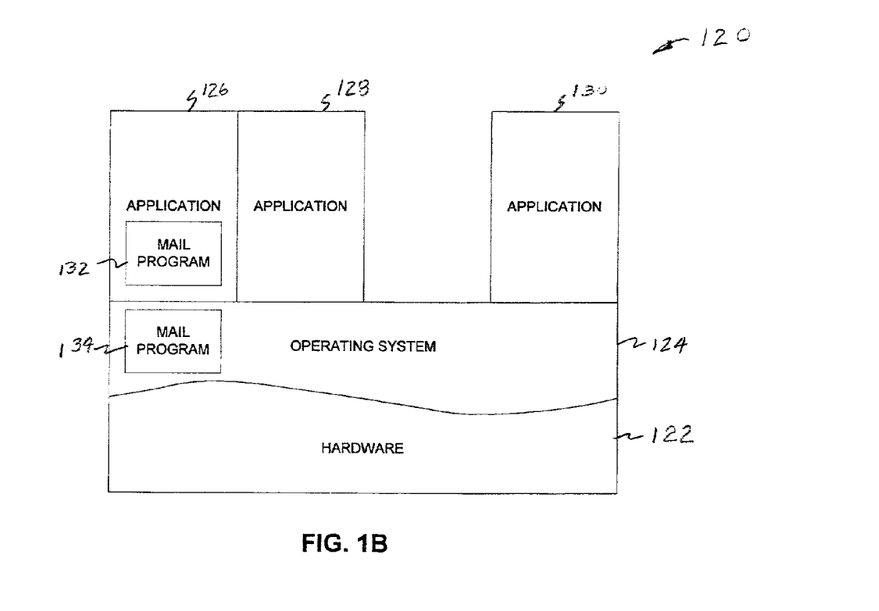
FIG. 1B is a block diagram of an exemplary system depicting an e-mail application program running on a computer hardware and operating system platform.

FIG. 1B depicts an exemplary computer environment 120 for client computer 106. It would be apparent to a person having skill in the art that environment 120 could also depict client computer 110 and server 112. Environment 120 includes hardware 122, operating system 124 and application programs 126, 128 and 130. Operating system 124 provides a uniform interface of application programming interfaces (APIs) to applications 126, 128 and 130 for access to hardware 122. An exemplary application 126 is an e-mail application program, mail program 132. Mail program 132 is an example of mail client 116 and mail server 118. Alternatively, a mail program 134 can be included as part of operating system 124 to provide e-mail functionality to applications 126, 128 and 130.

Referring back to FIG. 1A, mail client 116 can include an authentication input module which can accept a password from user 102 to validate that user 102 is authorized to access the e-mail account of user 102. Authentication input module 108 can interact with an authentication server module 136 of mail server 118 to determine whether user 102 is authorized to access the personal e-mail box of user 102. After authenticating user 102, authentication server module 136 can provide user 102 access via a storage module 138 to the mailbox of user 102 of e-mail storage 140.

Figure 2:
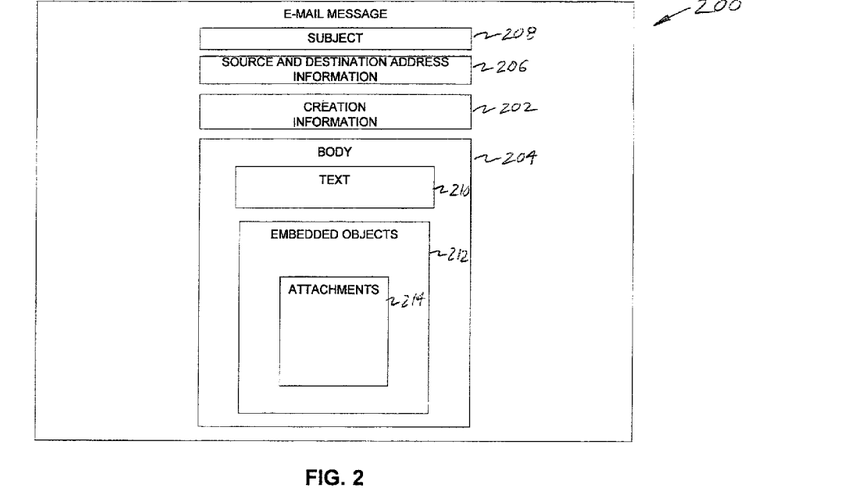
FIG. 2 depicts a conventional e-mail.

FIG. 2 illustrates an example of a conventional e-mail 200. E-mail 200 includes various data components. Example data components included in e-mail 200, are creation information 202, a body 204, address information 206, and a subject 208.

In an example embodiment, creation information 202 can include, e.g., the date and time e-mail 200 was sent from sending user 102 to receiving user 104. The body 204 of e-mail 200 can include, e.g., a text portion 210 and embedded objects 212. Embedded objects 212 can include, e.g., attachments 214. Other embedded objects 216 can include, e.g., bit map images, graphics objects, executable programs, compressed text and applets. Embedded objects 216 can also include a forwarded e-mail 200. Address information 206 can include the e-mail address of sending user 102 and receiving user 104 of e-mail 200. Attachments 214 can also include other embedded objects 212. Subject 208 can include a brief description of the contents of e-mail 200. It would be apparent to persons skilled in the art that e-mail 200 can include a subset of the listed components.

Figure 3:
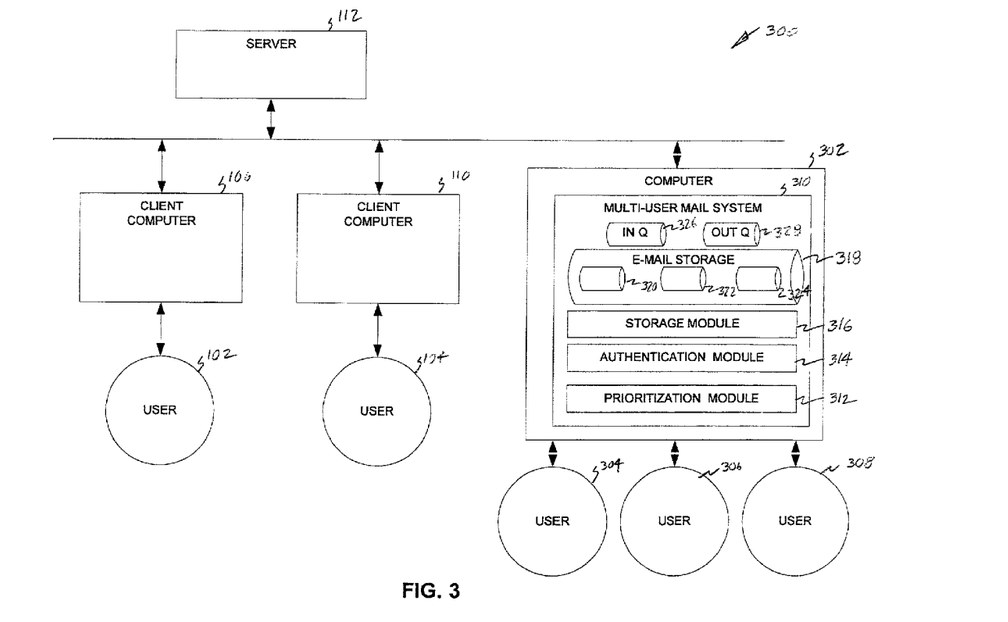
FIG. 3 is an example embodiment of a multi-user shared e-mail system according to the present invention.

FIG. 3 illustrates an example embodiment of an implementation of the present invention, including e-mail system 300. E-mail system 300 can include a computer 302 in communication with users 304, 306 and 308. Computer 302 includes a multi-user mail system 310. In a preferred embodiment, multi-user mail system 310 is a Point Clear e-mail system available from Point Clear.net, Inc. a wholly owned subsidiary of XANTE Corporation of Mobile, Alabama, USA. E-mail system 310 can include, in one embodiment, a prioritization module 312, an authentication module 314, a storage module 316, an e-mail storage module 318, an in queue 326 and an out queue 328.

Since multi-user mail system 310 runs on a single computer 302, only one of users 304, 306 and 308 can access computer 302 at one time. Access to computer 302 can be prioritized using prioritization module 312. Prioritization module 312 can indicate which of users 304, 306 and 308 should have priority to access computer 302 and multi-user mail system 310. In one embodiment, the urgency of e-mail messages can be indicated as a form of priority. For example, e-mails from a particular e-mail address could trigger a higher priority, such as, e.g., an e-mail from the CEO of a company. Other indications of priority could include, receipt of an e-mail message, versus having no new messages. Informally, a supervisor could have a higher priority than a line worker who, in turn, could have higher priority than a part-time worker.

If the highest priority user is user 304 then user 304 can proceed to authenticate using authentication module 314 by, e.g., entering a password, to access a storage environment 320.

Assuming the proper authentication information is provided, then storage module 316 can provide user 304 access to storage environment 320 of e-mail storage 318 via storage module 316.

When user 304 sends an e-mail to another user, the e-mail can be routed via an out queue 328 to its final destination.

When user 304 receives an e-mail message from another user, the e-mail can be queued at in queue 326.

In one embodiment, in queue 326 and out queue 324 can be used to delay sending or receipt and for filtering operations.

Figure 5:
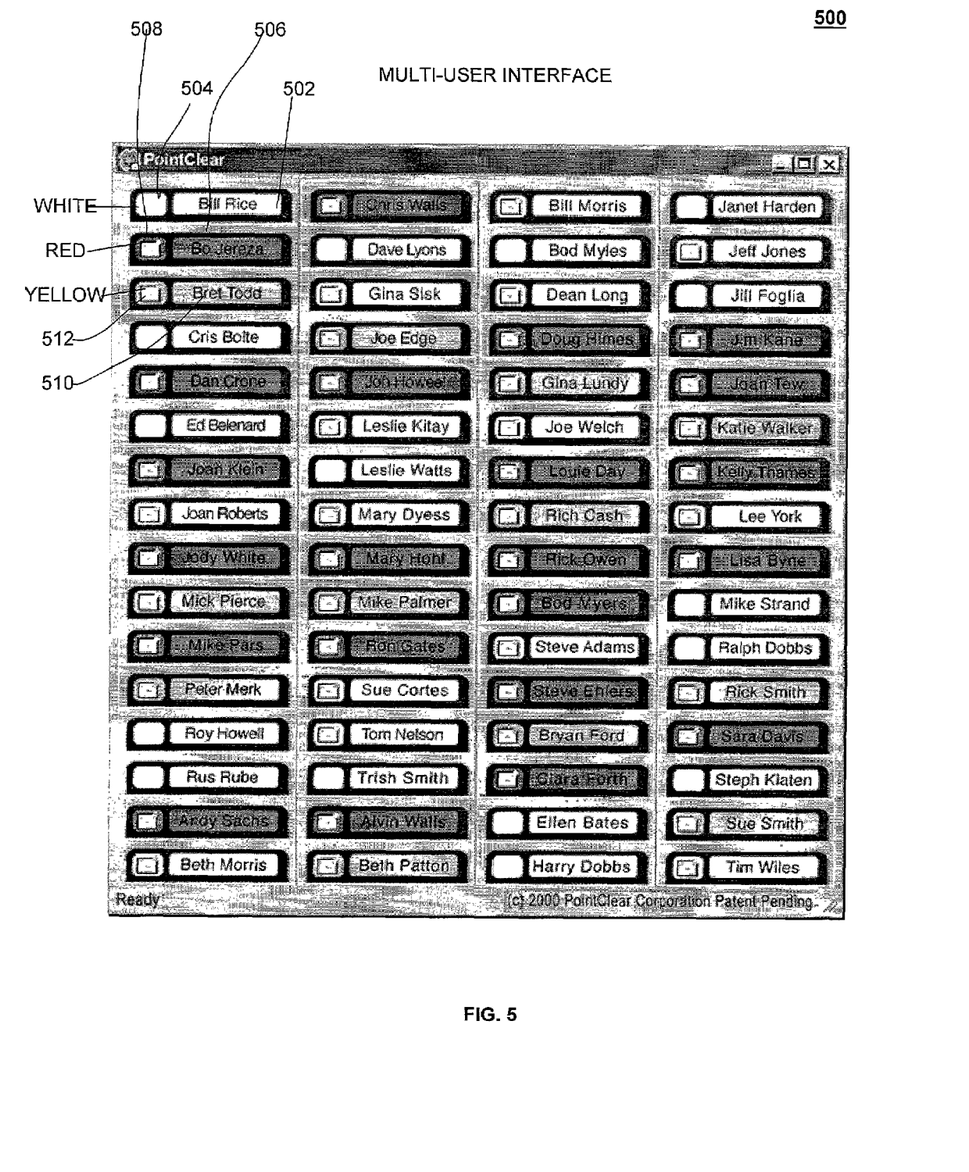
FIG. 5 depicts an exemplary embodiment of a user interface of the multi-user e-mail system of the present invention.

The present invention enables status of multiple users' e-mail accounts to be monitored and accessed from a single computer where each user is identified on a name screen. See FIG. 5 below depicting diagram 500 of an exemplary embodiment of a multi-user interface of the present invention. The exemplary embodiment of FIG. 5 depicts a graphical user interface (GUI) application, applet, or browser interface to the multi-user email system of the present invention. An exemplary implementation embodiment of the multi-user email system of the present invention is the PointClear™ system available from PointClear.net, Inc., a wholly owned subsidiary of XANTE Corporation of Mobile, Alabama, U.S.A.

In one embodiment, the single shared computer multiple e-mail system supports up to 64 users, or more, on the single computer. In another exemplary embodiment, 4 columns of 16 users can be displayed using the multi-user interface of the multi-user email system of the present invention as shown in diagram 500.

In one embodiment, a system administration tool can be used to configure each e-mail account at a company.

In one embodiment, the name screen is the default screen for the multiple e-mail account system listing e-mail accounts by user name associated with the computer.

In one embodiment, a time clock feature is included providing an electronic time clock. For example, a system administrator can identify time clock employees, in one embodiment, and can setup specific features that need to be logged such as, e.g., log-in, log-out, overtime, human resource reporting and supervisor warnings.

In another embodiment, if an e-mail environment window is left open and is idle for a specified time then the individual's e-mail window logs out of the system. Log out can be based on, e.g., passage of a time duration or other criteria. This feature prevents unauthorized access to an account by public viewing after a user leaves the system computer without logging out.

In one embodiment, the system of the present invention can be provided for a discount such as, e.g., free, if users are willing to watch advertising. Free evaluation use could also be provided. With a free evaluation use, a date is identified after which use is disabled. After completion of particular criteria, access can be re-enabled preserving all file folders. In one embodiment, an advertising banner can be included and can be placed in a fixed location. Advertising, in one embodiment, can be provided from In another embodiment, an address book importer can be provided to import address listings from other application programs.

In one embodiment of the invention, attachments of all types can be accessible for adding to an e-mail, saving from an e-mail, deleting from an e-mail, executing from the e-mail, and forwarding as an e-mail. An e-mail can also be forwarded as an attachment. Where an e-mail has several attachments, a user can select from multiple attachments by highlighting selected attachments for forwarding and the selected attachments only can be forwarded, in one embodiment.

In one embodiment, a spam eliminator can maintain a dynamic list of e-mail addresses that can be identified as sources from which e-mail is not accepted. The spam eliminator is a filter that can be based on e-mail address, domain name, or other identifier.

In one embodiment, online help can be provided.

In another embodiment, the address book can include groups of e-mail users.

In another embodiment, e-mail folder security can be provided restricting access to stored folders to only users entering authentication criteria such as, e.g., a password associated with that folder.

In another embodiment a spell checking feature can be provided.

In another embodiment, messages can be marked as urgent, (also referred to as hot, or hot mail), or can be identified as a priority level by inclusion in their body or otherwise of identifying priority information. In one embodiment, receipt of an urgent e-mail can initiate an urgency signal such as, e.g., a visual, graphical, or audio indication. Diagram 500 of FIG. 5, for example, depicts new mail via an envelope icon 512, 508. Urgency of the emails waiting a review by the multiple users can be indicated by, e.g., color coding such as, e.g., red 506 for the highest urgency, yellow 510 for intermediate urgency and white 502 for the lowest priority. Alternatively, other colors can be used. Alternatively an audio, visual, iconic, numeric, alphabetical, alphanumeric, or other indication of priority can be provided. Also, a higher priority can trigger, e.g., an audio alarm, or a wireless alert or page. No new mail 504 can be indicated on the multi-user interface as well.

In another embodiment of the present invention, inclusion of specific words or phrases in an e-mail, or subject portion, for example, can be recognized by consulting a library of words and phrases, and prior to receiving the e-mail containing the words or phrases, the e-mail can be rejected. An automatic response can be initiated to the sender of the message indicating what has happened, or even warning the sender of consequences of sending such e-mail.

In another embodiment of the invention, delayed message delivery can permit identification of a delivery date and time for delivery of the e-mail message.

Figure 7:
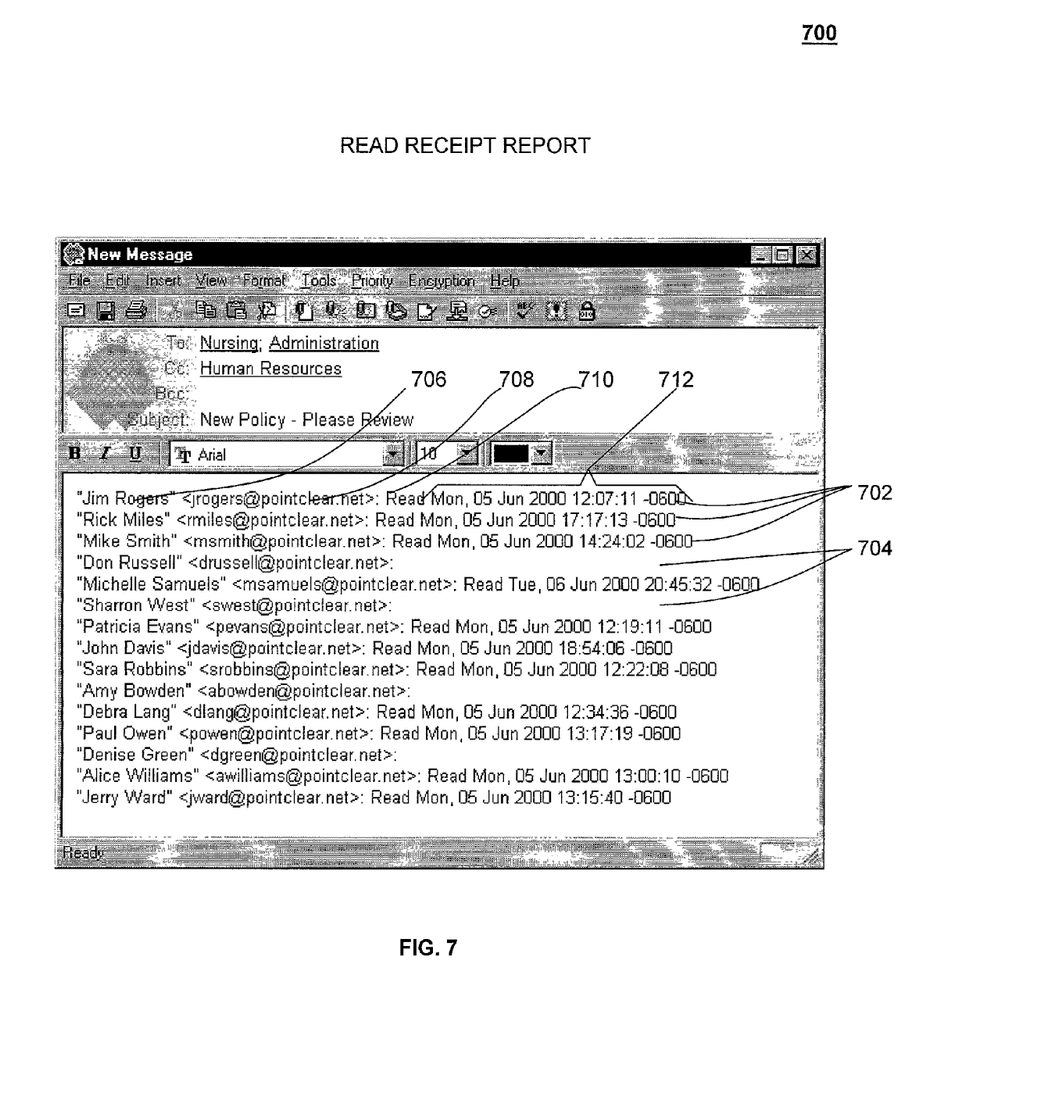
FIG. 7 depicts an exemplary embodiment of a read receipt report according to the present invention.

In another embodiment of the present invention, an e-mail account can be set up to auto forward any received e-mails to another e-mail address. In another, an autoreceipt feature can be enabled by a sender of an e-mail to verify that a receiver has, e.g., accessed, received, or opened e-mail. In an exemplary embodiment, a read receipt report can be displayed such as, e.g., the read receipt report as shown in FIG. 7 is described further below.

In another embodiment of the present invention, an encryption feature can enable entry of a personal encryption key between sender and receiver to control access to an e-mail. Multiple algorithms can be supported for encryption. Advantageously, in one embodiment, as new algorithms are developed, legacy algorithms can continue to be supported. Users of earlier revisions of the e-mail system set up with a first algorithm, can continue to use the first algorithm even when the program defaults to, e.g., a tenth algorithm. In one exemplary embodiment, a user's public key can be automatically generated by the present invention. In one embodiment, a public key can be automatically embedded in an email message that is being sent. The reader is referred to FIGS. 8A, 8B, and 8C for examples of a conventional public key infrastructure, exchange of public keys according to the present invention, and an email indicating a public key embedded at the top of the email shown when viewing the source code according to the present invention, respectively. Advantageously a user need not go through a complicated set up process as is conventionally required.

In an embodiment of the invention, when composing an e-mail and filling in the destination address field, for example, a list of names can be parsed as potential e-mail recipients based on the keys depressed by the sender of the e-mail. The more characters that are typed, in one embodiment, the narrower the selection of names. Pressing a key combination can list all possible candidates for the keys pressed, from which the user can select.

In an embodiment of the invention, a key or key combination can be defined by a user to perform tasks. Using this feature, a user can set desired actions for, e.g., function keys, and alternate and control key combinations.

In an embodiment of the invention, a user can insert a voicemail into an e-mail while composing the e-mail.

In an embodiment of the invention, a user can insert an audio/video recording into an e-mail.

In an embodiment of the invention, personal reminder memos can be created in the e-mail user environment.

In another embodiment, when an e-mail is received, the sender of the e-mail, automatically, or through prompting, can be added to the address book. In another embodiment, the carbon copy list can similarly be added to the address book.

In another embodiment of the invention, where an e-mail includes inserted greater than signs (">"), a feature can be included that deletes any greater than symbols from the beginning of a string. This character is often added by an e-mail system when forwarding an e-mail message. The ">" is a default character in many e-mail systems, but can be eliminated or changed to another character in some systems. Thus, in another embodiment, the character to be removed can be designated.

Figure 6:
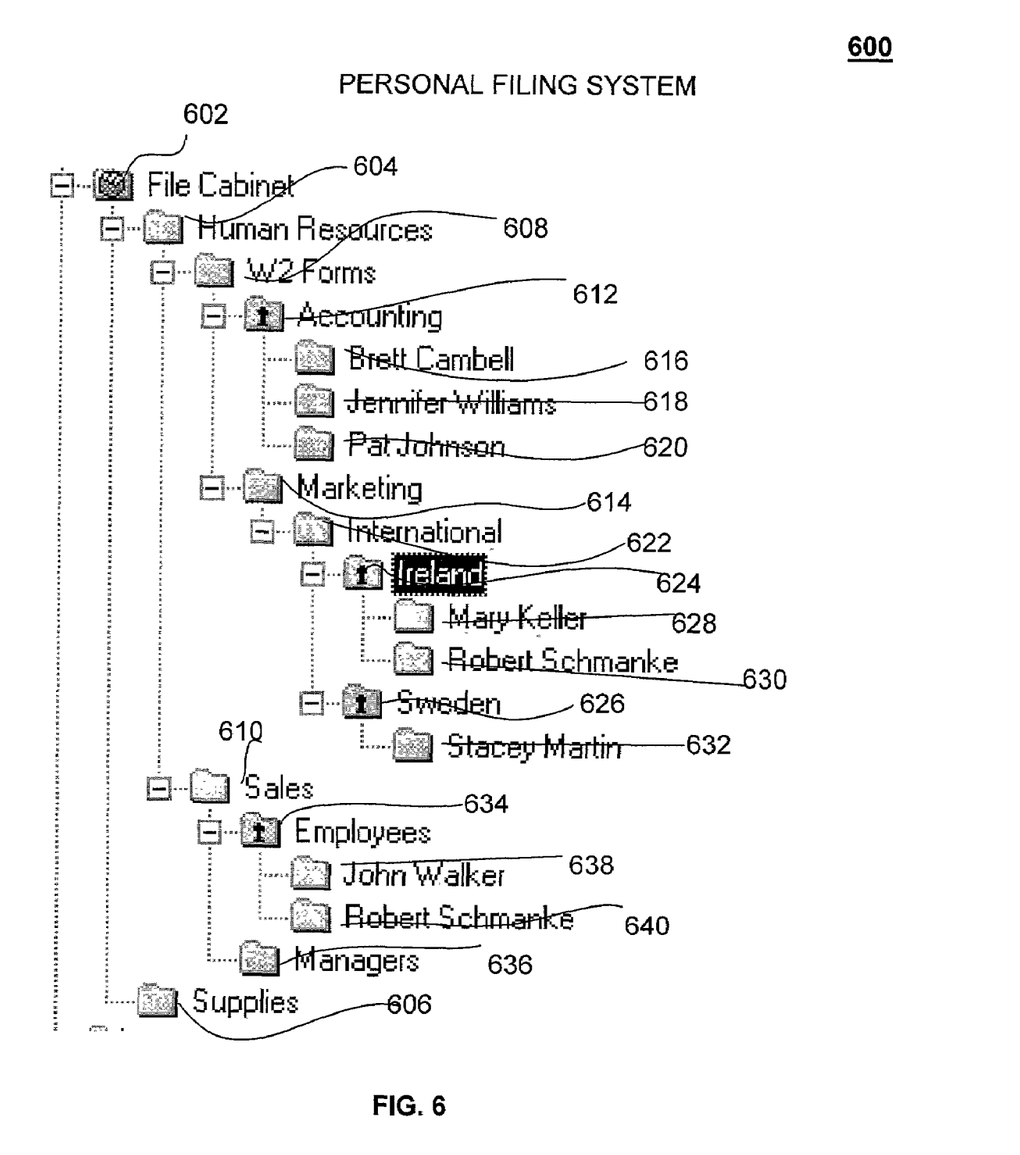
FIG. 6 depicts an exemplary embodiment of a personal file folder system of the present invention.

FIG. 6 depicts a user interface illustrating an exemplary embodiment of a personal filing system 600 of the present invention. The personal filing system 600 can include a user's e-mail environment including a file cabinet 602. The file cabinet 602 is a folder identified as a location to create personal nested sub-folders into which a user can organize incoming and outgoing e-mail. The user, in one embodiment, can set the properties for sending and receiving e-mail related to the file cabinet. For example, all e-mails sent by a sending user can be automatically stored in a personal folder in the sending user's personal file cabinet 600. In an exemplary embodiment, the email stored in a file folder named by the recipient's e-mail address or user name. In an exemplary embodiment, a read receipts continually updateable file can be stored in an assigned folder. A user can also modify the folder into which the e-mail can be stored upon sending.

Similarly, for an email received from a sender at a recipient, the e-mail can be stored automatically into an assigned folder such as, e.g., a folder that can be set by the sending user's e-mail address or user name. In an exemplary embodiment, upon receiving an email, a recipient by selection of a single button can cause the email to be automatically stored in the assigned personal folder.

In an embodiment of the invention, a user's e-mail configuration can be mirrored on a server that can be accessible from a web browser, or a remote version of the mail system. This interface can give a user access to the user's address book and all the user's folders as if the user were sitting in front of the multi-user shared e-mail system computer. The user that is sending and receiving e-mail, can also be viewed, by the recipients of the e-mail, as being at the recipient's desks.

The present invention is computer platform independent. Client computer 106 in a preferred embodiment is a personal computer (PC) system running an operating system such as Windows Mac/OS, or a version of UNIX. However, the invention is not limited to these platforms. Instead, the invention can be implemented on any appropriate computer system running any appropriate operating system, such as, for example, Solaris, Irix, Linux, HPUX, OSF, Windows, Windows NT, OS/2, Mac/OS. In one embodiment, the present invention is implemented on a computer system operating as discussed herein. In another embodiment, the present invention can be implemented on hardware such as a handheld device, such as, e.g., a two-way pager, a cellular phone, a digital phone, a watch, a wireless device, a laptop, notebook or sub-notebook computer, and other computer type device such as, e.g., a micro-computer, a mini-computer and a mainframe computer.

Figure 4:
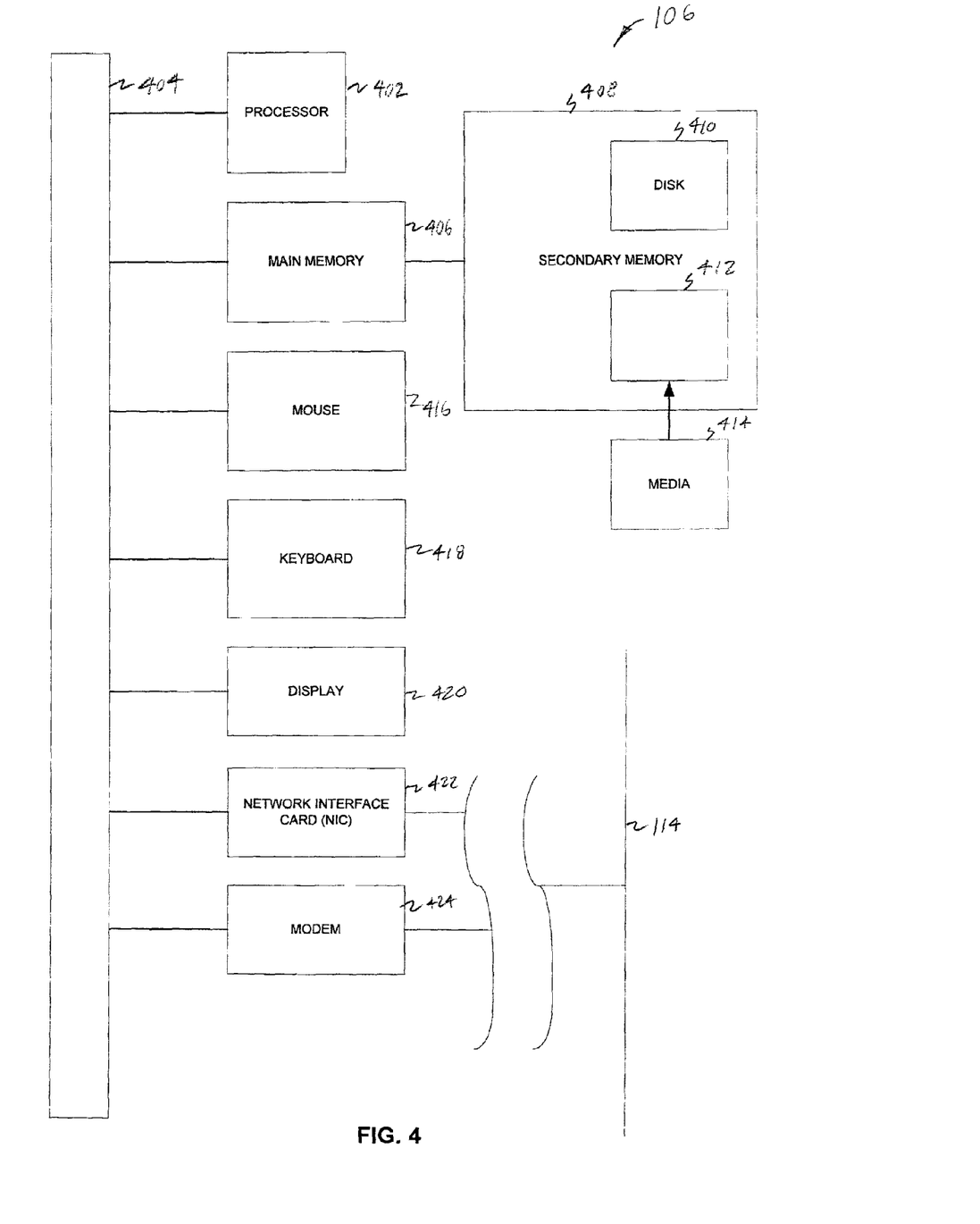
FIG. 4 depicts an exemplary computer system of the present invention.

FIG. 4 depicts an exemplary client computer 106 computer system. Other components of the invention, such as client computer 110, computer 302, and/or server computer 112, could also be implemented using a computer such as that shown in FIG. 4.

The computer system 106 includes one or more processors, such as processor 402. The processor 402 is connected to a communication bus 404. Client computer 106 also includes a main memory 406, preferably random access memory (RAM), and a secondary memory 408. The secondary memory 408 includes, for example, a hard disk drive 410 and/or a removable storage drive 412, representing a floppy diskette drive, a magnetic tape drive, a compact disk drive, etc. The removable storage drive 412 reads from and/or writes to a removable storage unit 414 in a well known manner.

Removable storage unit 414, also called a program storage device or a computer program product, represents a floppy disk, magnetic tape, compact disk, etc. The removable storage unit 414 includes a computer usable storage medium having stored therein computer software and/or data, such as an object's methods and data.

Client computer 106 also includes an input device such as (but not limited to) a mouse 416 or other pointing device such as a digitizer, and a keyboard 418 or other data entry device. Client computer 106 also includes an output device such as display 418, which in one embodiment is a touch-enabled monitor. Client computer 106 can also include a network interface card 422 and/or a modem 424 which can be used to access network 114.

Computer programs (also called computer control logic), including object oriented computer programs, are stored in main memory 416 and/or the secondary memory 418 and/or removable storage units 414, also called computer program products. Such computer programs, when executed, enable the computer system 106 to perform the features of the present invention as discussed herein. In particular, the computer programs, when executed, enable the processor 402 to perform the features of the present invention. Accordingly, such computer programs represent controllers of the computer system 106.

In another embodiment, the invention is directed to a computer program product comprising a computer readable medium having control logic (computer software) stored therein. The control logic, when executed by the processor 402, causes the processor 402 to perform the functions of the invention as described herein.

In yet another embodiment, the invention is implemented primarily in hardware using, for example, one or more state machines. Implementation of these state machines so as to perform the functions described herein will be apparent to persons skilled in the relevant arts.

FIG. 5 depicts an exemplary embodiment of multi-user graphical user interface (GUI) 500 including an indication of status of a plurality of different user email accounts. The GUI illustrated is a personal computer based software application program. The GUI could just have easily been a workstation application, a UNIX application, a JAVA applet, or an Internet or world wide web ("WWW" or web) browser based homepage, or applet GUI. In an exemplary embodiment, an indication of priority can be included. For example, a prioritization indication can be provided to indicate which email account should have priority. In one embodiment, a visual indication can be used. In another, an audio indication can be provided. In one embodiment, a color scheme can be used, as shown, including white record 502, 504, with lowest priority. An icon 508, 512, or no icon 504 can be used to indicate whether new mail has been received for one of the multi-user accounts. To provide prioritization, a yellow colored indication 510, 512 can stress a medium priority message. In the exemplary embodiment, a higher priority message 506, 508 can be stressed by coloring them red. A low priority message can be colored white. Selection of a user account by touching a touch screen, or selecting with a mouse or other input device such as, e.g., a keyboard, remote control, or cursor keys, can cause the email account environment to be opened, assuming the user can provide authentication such as, e.g., a password, a biometric, or other identification information.

FIG. 6 depicts an exemplary embodiment of a personal file system 600. Personal file system 600 can include a plurality of personal folders 602-640 for storing sent and received emails. FIG. 6 depicts a user interface illustrating an exemplary embodiment of a personal filing system 600 of the present invention. The personal filing system 600 can include a user's e-mail environment including a file cabinet 602. The file cabinet 602 is a folder identified as a location to create personal nested sub-folders into which a user can organize incoming and outgoing e-mail. The user, in one embodiment, can set the properties for sending and receiving e-mail related to the file cabinet. For example, all e-mails sent by a sending user can be automatically stored in a personal folder in the sending user's personal file cabinet 600. In an exemplary embodiment, the email stored in a file folder named by the recipient's e-mail address or user name. In an exemplary embodiment, a read receipts continually updateable file can be stored in an assigned folder. A user can also modify the folder into which the e-mail can be stored upon sending. Similarly, for an email received from a sender at a recipient, the e-mail can be stored automatically into an assigned folder such as, e.g., a folder that can be set by the sending user's e-mail address or user name. In an exemplary embodiment, upon receiving an email, a recipient by selection of a single button can cause the email to be automatically stored in the assigned personal folder.

FIG. 7 depicts an exemplary embodiment of an assigned read receipt folder's read receipt report 700. Read receipt report 700 can include names 706, and email addresses 708 of recipients of the email. Upon access of the email by recipients, the read receipt report 700 can be automatically updated to include, e.g., a date and time 712 of the access, and type of access 710. The read receipt report 700, can provide various types of information in a record 702. If the email has not been accessed yet, then a blank record 704 can be provided.

Figure 8A:
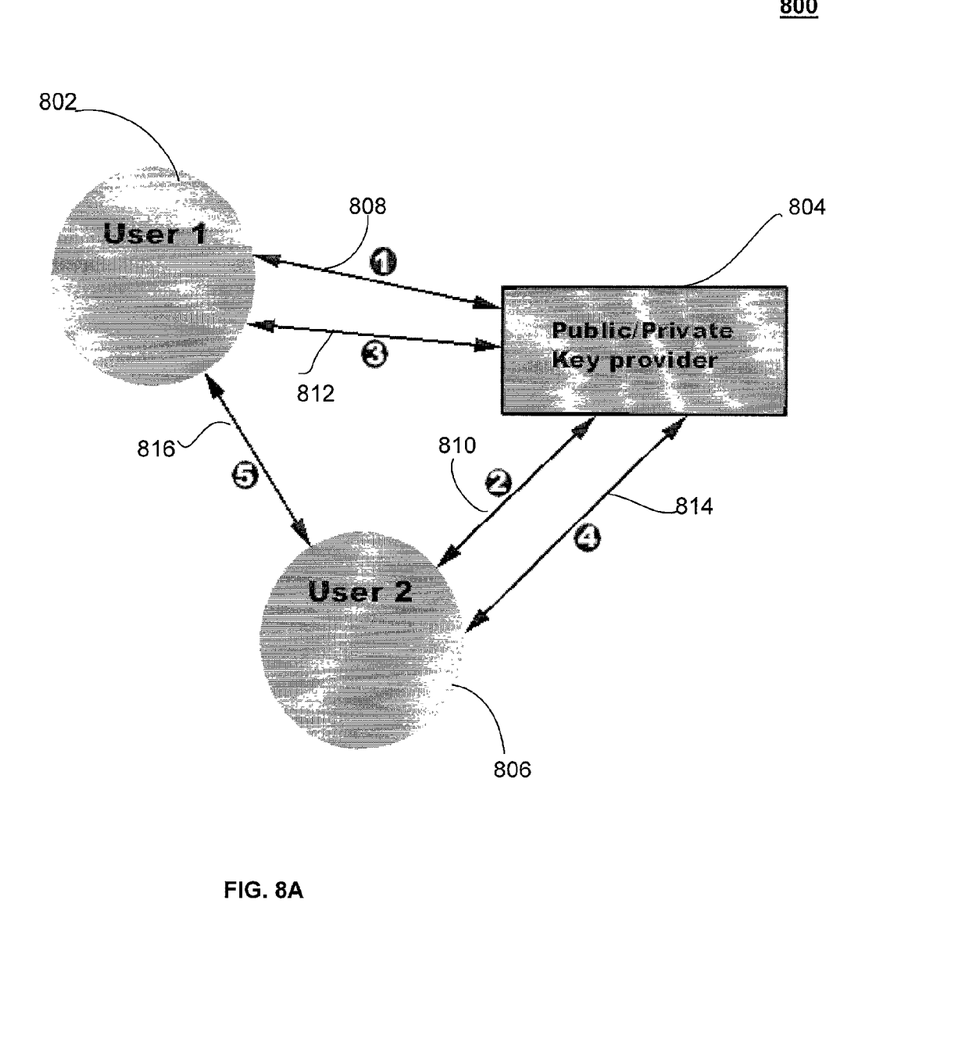
FIG. 8A depicts an exemplary setup process of a public key infrastructure (PKI) using a public and a private key.

FIG. 8A depicts a conventional public key infrastructure (PKI) 800 indicating an exemplary configuration of a user 1 802 in communication with a public/private key provider 804. Public/Private key 804 can provide information from user 2 806 to provide communication between users 802, 806.

A conventional process 800 as shown in FIG. 8A can begin with step 808.

In step 808, User 1 802 sets up an account with an encryption public/private key provider 804. From step 808, process 800 can continue with step 810.

In step 810, User 2 806 sets up an account with the encryption public/private key provider 804. Suppose User 1 802 desires to send an encrypted message to User 2 806. From step 810, process 800 continues with step 812.

In step 812, User 1 802 must learn the public key of User 2 806 by communicating with the public/private key provider 804, must search for User 2 806, and must add the key information to the email address book of User 1 802 relating to User 2 806.

Suppose User 2 806 also desires to send an encrypted message to User 1 802. Process 800 continues with step 814.

In step 814, User 2 806 also must learn the public key of User 1 802 by communicating with the public/private key provider 804, must search for User 1 802 and must add the key information to the email address book of User 2 806, relating to User 1 802. From step 814, process 800 can continue with step 816.

In step 816, User 1 802 and User 2 806 can finally send encrypted messages to each other.

An example of a conventional system implementing the system of FIG. 8A is that of Microsoft Outlook Express, available from Microsoft Corporation of Redmond, Wash., U.S.A. Such conventional systems are cumbersome to operate and require extensive user customization as already detailed, unlike the present invention. For example, the Microsoft Outlook Express Help Index describes a difficult process by which the public/private key encryption features can be setup in Outlook. The following excerpt from the Microsoft Outlook Express Help Index, the contents of which is incorporated herein by reference in it's entirety, is demonstrative of the difficulty of such conventional solutions as shown in FIG. 8A:

Sending Secure Messages

As more people send confidential information by e-mail, it is increasingly important to be sure that documents sent in e-mail are not forged, and to be certain that messages you send cannot be intercepted and read by anyone other than your intended recipient.

By using "digital Ids" with Outlook Express, you can prove your identity in electronic transactions in a way similar to showing your driver's license when you cash a check. You can also use your digital ID to encrypt messages, keeping them private. Digital IDs incorporate the S/MIME specification for secure electronic mail.

How do Digital IDs Work?

A digital ID is composed of a "public key," a "private key," and a "digital signature." When you digitally sign your messages, you are adding your digital signature and public key to the message. The combination of a digital signature and public key is called a "certificate."

Recipients can use your digital signature to verify your identity and use your public key to send you encrypted mail that only you can read by using your private key. In order to send encrypted messages, your address book must contain digital IDs for the recipients. That way, you can their public keys to encrypt the messages. When a recipient gets an encrypted message, their private key is used to decrypt the message for reading.

Before you can start sending digitally signed messages, you must obtain a digital ID and set up your mail account to use it. If you are sending encrypted messages, your address book must contain a digital ID for each recipient.

Where do you get Digital IDs?

Digital IDs are issued by independent certification authorities. When you apply for a digital ID at a certification authority's Web site, they verify your identity before issuing an ID. There are different classes of digital IDs, each certifying to a different level of trustworthiness. For more information, use the Help at the certification authority's Web site.

In order to obtain someone else's digital ID, you can request they send you digitally signed mail, or you can search the digital ID database on a certification authority's Web site. You can also search Internet directory services that list digital IDs along with other properties.

How do you Verify a Digital Signature?

With "revocation checking," you can verify the validity of a digitally signed message. When you make such a check, Outlook Express requests information on the digital ID from the appropriate certification authority. The certification authority sends back information on the status of the digital ID, including whether the ID has been revoked. Certification authorities keep track of certificates that have been revoked due to loss or termination.

Figure 8B:
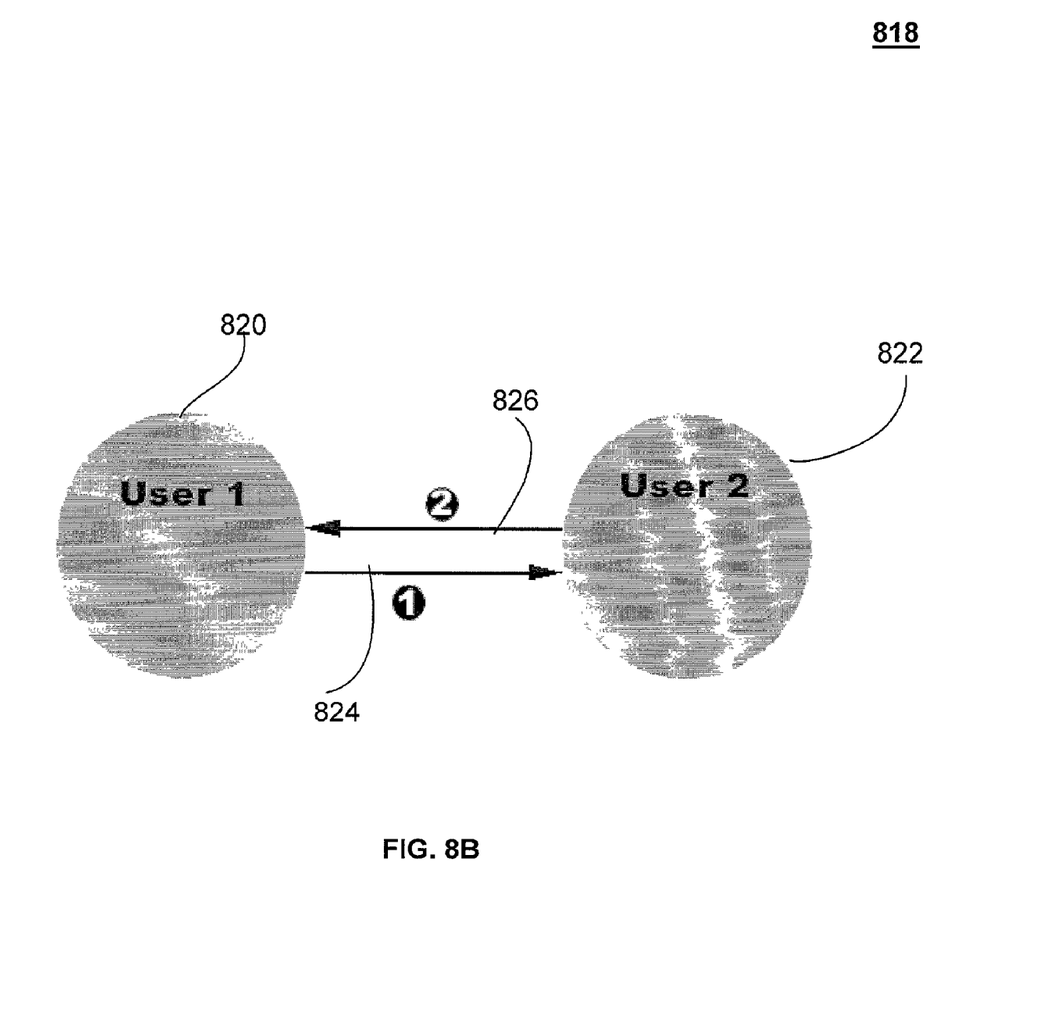
FIG. 8B depicts a exemplary embodiment of an improved setup process for configuring public and private keys according to the present invention.

FIG. 8B depicts an exemplary embodiment of an improved configuration method that configures a secure public/private key configuration method 818. User 1 802 can send in step 824 a message to user 2 822. In step 826, user 2 822 can send an email to user 1 820. Since, according to the present invention, a user 820, 822 can automatically have a public key be embedded in the email, the exchange shown can automatically provide public keys to the recipients of the messages.

Using the present invention, two users interested in exchanging public keys can perform the following steps:

1. Both sender and receiver can be using PointClear on their respective systems or computer(s);

2. User1 802 can send a message to User2 822; and

3. User2 822 can send a message to User1 802.

In an exemplary implementation embodiment, the above listed steps can be performed using the PointClear e-mail program of PointClear.net, Inc. of Mobile, Alabama, USA.

Figure 8C:
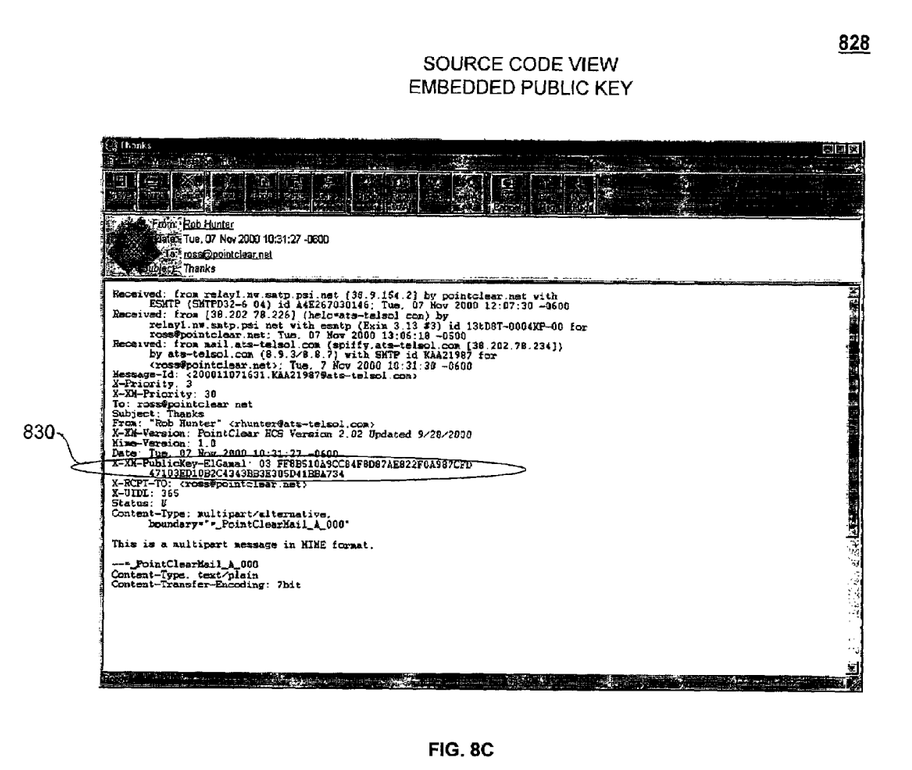
FIG. 8C depicts an exemplary embodiment of a source code view of an email including an automatic embedded public key according to the present invention.

FIG. 8C shows an exemplary embodiment of a view 828 of an email in which a public key has been embedded for ease of providing a user's public key to another user for use in communicating via an encrypted communication, according to the present invention. The view 828 is shown in a view revealing the source code of the email.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A shared multi-user email system on a single computer, comprising:
   a shared computer;
   a multi-user email system configured to run on said shared computer configured to enable a plurality of users, one at a time, to access said multi-user email system running on said shared computer;
   a multi-user graphical user interface (GUI) configured to display concurrently current status of multiple email accounts of said plurality of users,
       wherein said multi-user GUI permits one user of said plurality of users at a time to access an email user account environment of said one user of said plurality of users on said multi-user email system,
       wherein said one user, if authenticated, can access only said email user account environment belonging to said one user,
       wherein each of said email user account environments includes an inbox, an outbox, and at least one personal file folder; and
   a network interface coupled to said shared computer through which emails can be routed to destination addresses not included in said multi-user email system.

2. The system according to claim 1, wherein said multi-user GUI includes an indication of the priority of email received in said multi-user email system enabling prioritization of access to said shared computer by said users.

3. The system according to claim 2, wherein said indication of priority includes at least one of the following indications of priority:
   an audio;
   a visual;
   a color;
   an iconic;
   a communication to a communication device;
   a page to a pager;
   a numeric;
   an alphabetic;
   a letter;
   a character;
   an alert; and
   a wireless alert.

4. The system according to claim 1, wherein the system is used in at least one of a production, operations, healthcare, retail, hospital, and nursing environments.

5. A real time multi-user graphical user interface (GUI) comprising:
   a status module enabling a computer to indicate current status of multiple email accounts of a plurality of users, concurrently, on a shared multi-user computer.

6. The GUI according to claim 5, wherein said status module comprises:
   a priority indicator enabling the computer to indicate priority of access to the shared multi-user computer.

7. The GUI according to claim 6, wherein said priority indicator comprises at least one of:
   a visual indicator;
   an audio indicator;
   a color indicator;
   a numeric indicator;
   a alphabetic indicator;
   an alphanumeric indicator;
   an iconic indicator;
   a communication;
   a communication device;
   an alert;
   a wireless alert; and
   a page.

8. The GUI according to claim 5, wherein said status module comprises:
   a new mail indicator enabling the computer to indicate that a new mail has arrived for one of said plurality of users of said shared multi-user computer.

9. The shared multi-user email system of claim 1, further comprising:
   a user-assignable personal file folder, wherein said user-assignable personal file folder has associated with said user-assignable personal file folder a property including at least one of: at least one recipient, a sender, an email address of the sender, a username of a sender, an email address of the at least one recipient, or a username of the at least one recipient,
   a user selectable save message instruction operative, upon a selection by the user of a single user interface element, to automatically store in one of one or more user selected user-assignable personal file folders, a user selected previously received message,
   wherein the system automatically stores an outgoing message, at the same time as said outgoing message is sent, to at least one user-assignable personal file folder having associated with the user-assignable personal file folder a recipient of the outgoing message.

10. The system according to claim 9, wherein the system is operative to automatically create a new one of said user assignable personal file folders, automatically tagged to at least one of the email address of, or the username of the sender of said previously received message when no user assignable personal file folder exists for the sender of said message.

11. The system according to claim 9, wherein the electronic message system is operative to automatically store in a user-assignable personal file folder associated with the sender of read receipt report, said report received from the sender of said read receipt report in response to a previously sent message.

12. The system according to claim 11, wherein said read receipt report is a dynamic, active read receipt report comprising:
   a continually updated single file indicating read receipt status indicating which of a plurality of recipients of a previously sent message have and/or have not accessed said previously sent message, and wherein said read receipt report tracks a date and time of access by one of a plurality of recipients of said previously sent message.

13. The system according to claim 9, wherein said user interface element comprises at least one of an icon, a menu selection, and/or a button.

14. The system according to claim 9, wherein the system is operative to automatically create a new user-assignable personal file folder.

15. The system according to claim 9, wherein the system is operative to store a plurality of user-selected previously received messages in one of said user-assignable personal file folders associated with said sender of said previously received messages upon selection by the user of the single user interface element.

* * * * *